United States Patent [19]

Loder

[11] Patent Number: 5,044,485

[45] Date of Patent: Sep. 3, 1991

[54] MOVING WALKWAY

[75] Inventor: John L. Loder, Hawthorn, Australia

[73] Assignee: Loderway Pty. Limited, Australia

[21] Appl. No.: 609,014

[22] Filed: Oct. 31, 1990

Related U.S. Application Data

[63] Continuation of Ser. No. 384,707, Jul. 25, 1989, abandoned.

[30] Foreign Application Priority Data

Jul. 25, 1988 [AU] Australia ................................. PI9432
Jan. 9, 1989 [AU] Australia ................................. PI2195

[51] Int. Cl.$^5$ .................................................. B66B 29/08
[52] U.S. Cl. ..................................... 198/325; 198/334; 198/841; 198/600
[58] Field of Search .............. 198/321, 324, 325, 334, 198/841, 600

[56] References Cited

U.S. PATENT DOCUMENTS

| | | | |
|---|---|---|---|
| 2,268,724 | 1/1942 | Shackelford | 198/600 |
| 2,517,983 | 8/1950 | Crosland | 198/600 X |
| 2,536,961 | 1/1951 | Smith | 198/600 X |
| 2,569,711 | 10/1951 | Foster | 198/600 X |
| 2,668,708 | 2/1954 | Back | 198/600 X |
| 2,782,896 | 2/1957 | Kendall et al. | 198/324 |
| 2,804,191 | 8/1957 | King | 198/324 |
| 2,862,599 | 12/1958 | Sinden et al. | 198/324 X |
| 2,862,603 | 12/1958 | Sinden | 198/324 |
| 3,150,757 | 9/1964 | Jin | 198/324 |
| 3,592,139 | 7/1971 | Patin | 198/321 |
| 3,627,108 | 12/1971 | Hansen | 198/600 |
| 3,711,090 | 1/1973 | Fiedler | 198/841 X |
| 4,008,801 | 2/1977 | Reilly et al. | 198/840 X |

FOREIGN PATENT DOCUMENTS

| | | | |
|---|---|---|---|
| 0197315 | 9/1986 | Japan | 198/600 |
| 1352993 | 5/1974 | United Kingdom | 198/600 |

Primary Examiner—D. Glenn Dayoan
Attorney, Agent, or Firm—Larson and Taylor

[57] ABSTRACT

A beltway comprised of at least one beltway section which has two spaced small diameter rollers which define the ends of the section, a drive unit and a thin flexible continuous slider belt which is adapted to pass over the rollers defining the ends of the section and to be driven by the drive unit. At junctions between two beltway sections a transfer plate is located. The transfer plate is formed to terminate close to the belt on either side thereof so that there is a smooth transition from the belt to the transfer plate and is of a width, in the direction of movement of the beltways, such that a user is in contact with the receiving beltway before losing contact with the delivery beltway.

10 Claims, 2 Drawing Sheets

MOVING WALKWAY

This application is a continuation of application Ser. No. 07/384,707 filed July 25, 1989 now abandoned.

FIELD OF THE INVENTION

This invention relates to a moving beltway for use by pedestrians or for the movement of goods and is particularly applicable, but not restricted, to moving beltways which have sections running at different speeds.

BACKGROUND OF THE INVENTION

Previous moving beltways have suffered certain disadvantages.

If they are to be a constant speed beltway the surface has either been very heavy belting or metal treads located on a carrier frame and each of these are inherently expensive and also provide mechanical problems in siting, in that when they are to return they need a substantial diameter roller, as the radius about which they can turn is large. This may involve the building of a pit or the like at each end of the beltway to receive the rollers.

A further major problem with moving beltways, quite generally but particularly if they are to be of variable speed or are long has been the translation of the user between a stationary position and the beltway and between adjacent parts of a beltway. This latter aspect has been considered most serious for two reasons. Firstly such transistions are normally required to be effected where the beltway is one which has a variable speed and thus the transition is occurring at a higher absolute speed than is the case with moving onto or off a standard beltway moving at a slow speed.

This means that whilst the relative speed between the two adjacent sections of beltway are relatively small, the belts or the like comprising the surfaces of the beltway are both travelling at relatively high speeds adjacent to the surrounding ground or wall defining the sides of the beltway.

Thus, should, for example, a user fall or an article attached to a person, such as part of a shoe a trailing portion of a garment or the like be caught between the belt or the plate or comb at the transition then the likelihood of injury is substantially greater than would be the case if the same accident occured on a slower speed beltway section.

There have been proposed ways in which to attempt to overcome these problems, but they have not been satisfactory and have not been commercially adopted.

They include the use of transfer plate sections which are movable in a plane normal to the beltways and the concept of short lengths of narrow belts which overlap in the direction of movement thereof, and belts which are at different levels so that a user has to physically step from one belt upwardly or downwardly to the next adjacent belt. Also where the belts are ribbed, which has normally been the case, the transfer area must include combs, and where the belts are heavy and are passing over relatively large diameter rollers, it has been practically, extremely difficult if not impossible to maintain accurate narrow spacings between the combs and the belt when the belt is travelling at a high speed.

SUMMARY OF THE INVENTION

The first object of the present invention is to provide a beltway arrangement which can minimise the problems and which can be used either as a constant speed or variable speed beltway.

A second object of this aspect of the invention is to provide in a moving beltway transitions between two beltway portions or a stationary end and a beltway portion which effectively prevent any part of a passenger or his or her clothing or accoutrements on the beltway being caught on or by part of the beltway or its components. The invention includes, in its broadest sense, a beltway comprised of at least one beltway section which has two spaced small diameter rollers which define the ends of the section, drive means and a thin flexible continuous slider belt which is adapted to pass over the rollers defining the ends of the section and to be driven by the drive means.

At each end of a horizontal length of belt there can be a plate having an inner edge formed to closely abut the belt as it passes around the roller at the beginning or end of its run, the upper surface of the plate being smooth to facilitate easy transition thereacross and the spacing between the edge of the plate and the upper surface of the belt being small, generally less than 1.0 mm, to prevent articles passing therebetween.

The beltway can comprise a number of adjacent belt sections each of which closely abut the next adjacent section and this is essential where the beltway is to be one on which the speed varies along the length.

In such an arrangement the beltway can also have a long "central" section which operates at a constant speed and which has shorter beltway sections adjacent each end thereof.

In one aspect of this, the invention includes a junction between two beltway sections wherein there is a transfer plate between the two sections characterized in that at least part of the upper surface of the transfer plate is located at a level below the level of the upper surface of the preceding belt.

In a specific arrangement the surface of the transfer plate is curved downwardly so that the edge of the transfer plate which is adjacent the end of the delivery belt section is at a lower level than the central portion of the transfer plate.

The arrangement is specifically useful for a beltway travelling at relatively high speeds.

In an alternative aspect which is suitable for relatively low speed beltways we use ribbed belts for at least some portions of the beltway and the combs used with these belts are so formed as to have longitudinal members which are narrower than and shallower than the spacing between the ribs of the belt running the length of the belt between two transfer plates.

This arrangement means that a person wearing a normal shoe or any reasonable sized body is supported by the ribs of the belt but any narrower body such as, for example a woman's spike heel which can fit between the belt ribs can rest on the longitudinal member between adjacent ribs but will slide along this member. As a person's shoe is transferred from one belt to the next the heel will be automatically carried onto the transfer plate and subsequently onto the next belt section.

The longitudinal member may be rods or bars.

Such an arrangement is preferably only used on the lower speed portions of the beltway as they are not necessary for the higher speed portions.

BRIEF DESCRIPTION OF THE DRAWINGS

In order that the invention may be more readily understood, reference will be made to the accompanying drawings in which.

DESCRIPTION OF THE PREFERRED EMBODIMENTS

The specifically illustrated embodiment shows an arrangement which is for a beltway having variations in speed along its length but, as will be described hereinafter, the invention also relates to a constant speed beltway.

The beltway can be deemed to be made up of a number of independent modules 2 and these modules may be individually replaceable so that should there be a fault in any particular module it can readily be removed and replaced thus limiting the down time of the beltway.

Figure 1:
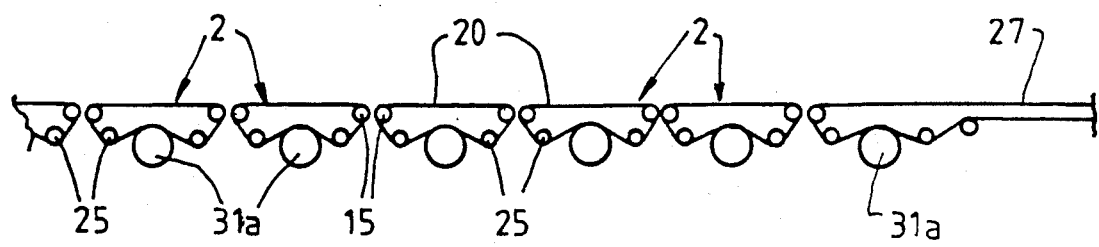
FIG. 1 is a schematic view of part of a beltway of the invention.

Referring specifically to FIG. 1, there are a number of modules 2 each of which has a roller 15 at each end thereof and a belt 20 passing thereover.

For convenience, where required, and when referring to adjacent beltway sections, we shall use the term delivery and receiving to indicate the appropriate section.

The belt 20 passes beneath a pair of idler rollers 25 and is driven by a driver roller 31a. One or more of the idler rollers 25 may be adjustable to enable the belt 20 to be tensioned.

Figure 2:
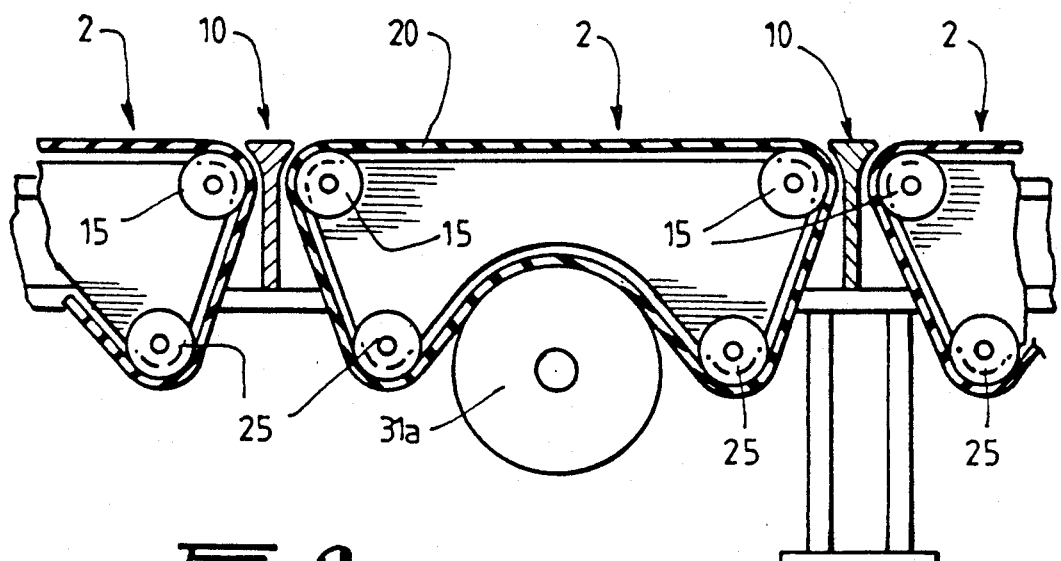
FIG. 2 is a side sectional elevation of one of the modules of the beltway.
Figure 3:
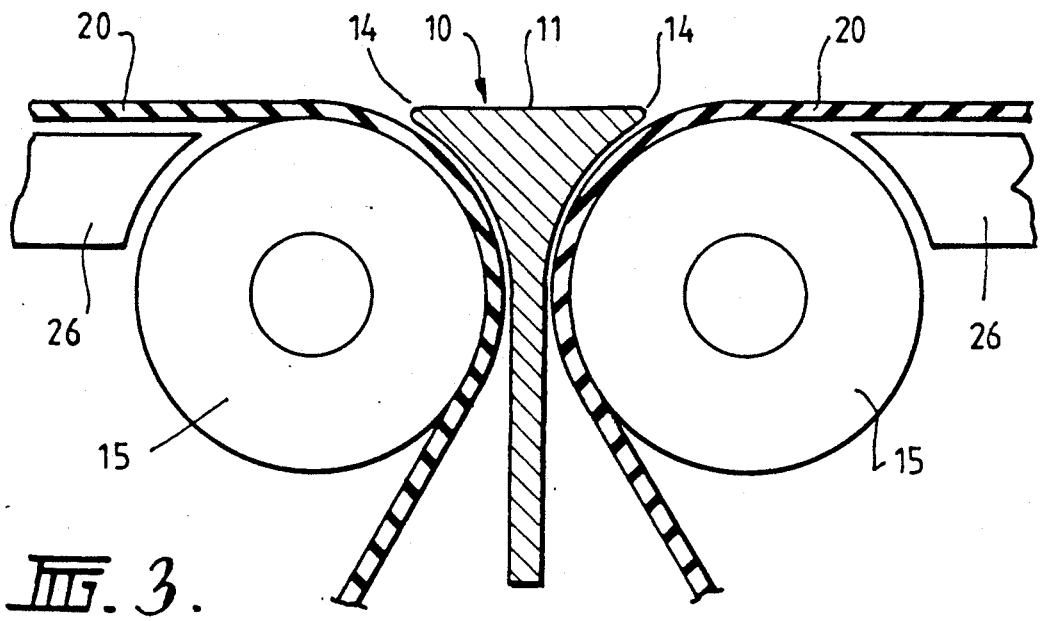
FIG. 3 is an enlarged view showing the arrangement at the junction between two modules.

It will be seen from the schematic in FIG. 1, that the top runs of the belts 20 normally lie in the same plane and can as better be seen from FIGS. 2 and 3 because the overall spacing between the belts 20 is only minimal.

If changes in grade are required, the planes of the top runs of the belts can be at angles to each other.

The first or last sequence of belts in a system would be relatively short, the upper run could be of the order of 300 to 1000 mm. The belts 20 can be relatively thin and this permits the belts to pass over pulleys of a very small diameter. For example the diameter of the pulleys 15 could be of the order of 30 to 70 mm.

This means that the effective space between the adjacent portions of the upper run is only of the order of 20 to 40 mm which is substantially less than the length of a user's shoe, even if the user has only a very small foot, such as a child. The under-surface of the upper run of the belt is supported on a slider plate 26.

Located between each pair of modules there is a plate 10 which has an upper surface 11, which may be polished which provides a low friction surface for the footwear of a user of the beltway so that if the user is standing on the beltway with his or her feet substantially parallel to the direction of movement of the beltway then they will be transferred from one module to the other with no difficulty whatsoever.

As can be seen specifically from FIG. 3 the edge 14 of the plate 10 is adapted to closely approach the thin belt 20 as it passes over the small diameter roller 15.

The tolerance of the thickness of the belt is controlled so that the spacing between the periphery of the roller 15 and the edge 14 of the plate 10 defines a passage which is only slightly greater in width than the thickness of the belt so that as the belt passes under or leaves from the outer edge of the plate 10 the spacing between that edge and the belt 20 is very small so articles can not be drawn therein.

It is preferred that the tolerance is such that a flowing piece of material, such as a belt or the hem of a coat or a dress cannot readily pass therebetween.

It is also preferred that there is a sensor associated with the junction so that if anything should enter the spacing, the belts are stopped.

Adjacent to the terminal or downstream end of the highest speed module 2 there is a long belt 27 which can provide the central part of the beltway.

Although not fully illustrated, it is preferred that the drive rollers 31a are all driven from the same power source or that the power sources be centrally controlled so that if there is any failure in the drive this effects all of the modules equally and at the same time, so that there can be no inherent difficulty which could occur if a person is moved from a moving module to a stationary module.

The pulleys or gearing between the modules and the drives can be different diameters so that there can, over the length of the beltway, be a gradual increase in speed from an initial speed which is acceptable to a passenger entering a beltway, for example between 0.4 to 0.9 meters per second up to a speed which could be as high as 3.5 meters per second, and then a reduction in speed through a number of modules to an exit speed of, again, 0.4 to 0.9 meters per second.

The sequence of short belts operate so that each belt travels somewhat faster or slower than its neighbours. In this way the passengers on the beltway are speeded up on the acceleration section at the start of an installation, and slowed down at the end of it. By the time the passengers reach the long central section of constant speed belting, the spacing between the passengers is increased above the entrance spacing by the ratio of the speed of the constant speed belt to the speed of the first belt. The belt is therefore subjected to a lesser loading than it would have had if it was the only belt in the installation, and it does not have to contend with the acceleration forces of the smaller belts. In these circumstances it is possible to use a thin slider belt for the constant speed section which is capable of being returned about a 30 to 70 mm diameter roller, as are the short belts and can therefore be brought within 20 to 40 mm of the last accelerating or the first decelerating belt from which it will be separated by the plate 10 which is tha same as the plates between the modules.

The length of run of the constant speed belt will be determined by its vertical profile, its relative speed and the space available for the drive motor.

Longer passenger runs can be achieved by providing adjacent slider belts separated by plates 10 and which run at the same speed.

Changes of grade may be effected by introducing one or more sections of short belt, providing belts tangential to the theoretical sag curve between a horizontal belt, and a belt with a positive incline, each belt passing around smaller rollers 15 and separated by plates 10.

Over summit changes of grade the vertical profile of the slider plate can guide the long thin belt.

In the foregoing we describe arrangements, basically by using thin belts that can pass over narrow rollers, whereby the spacing between two adjacent belt sections in a moving beltway can be limited and, in these arrangements, we have described relatively narrow transfer plates which have a smooth upper surface over which portions of the shoes or other articles associated with a user and in contact with the belt can pass as there is transition from belt to belt.

It will be appreciated that there are practical difficulties in providing tolerances between the belt and the transfer plates which are so fine that it is not possible for an article, say such as a thin piece of dress material to pass between these if the flexible material is pressed against the opening by a solid object which by its weight eliminates the irregularities in the material which is abutting the opening and, of course, if such can occur then injury could be caused to the user. One method of avoiding or minimizing this difficulty is the provision of sensors as previously described.

We have calculated that this problem can be greatly reduced by locating the transfer plate below the level of the belts and by forming the upper surface of the transfer plate.

The transfer plates have a width of the order of 30 mm and on almost all occasions a user will transfer across the plate with the heel of the shoe, or even part of the sole of the shoe remaining on the delivery belt until after the leading edge of the shoe is received on the receiving belt and thus there will only be minimal contact, if any, with the transfer plate.

Figure 4:
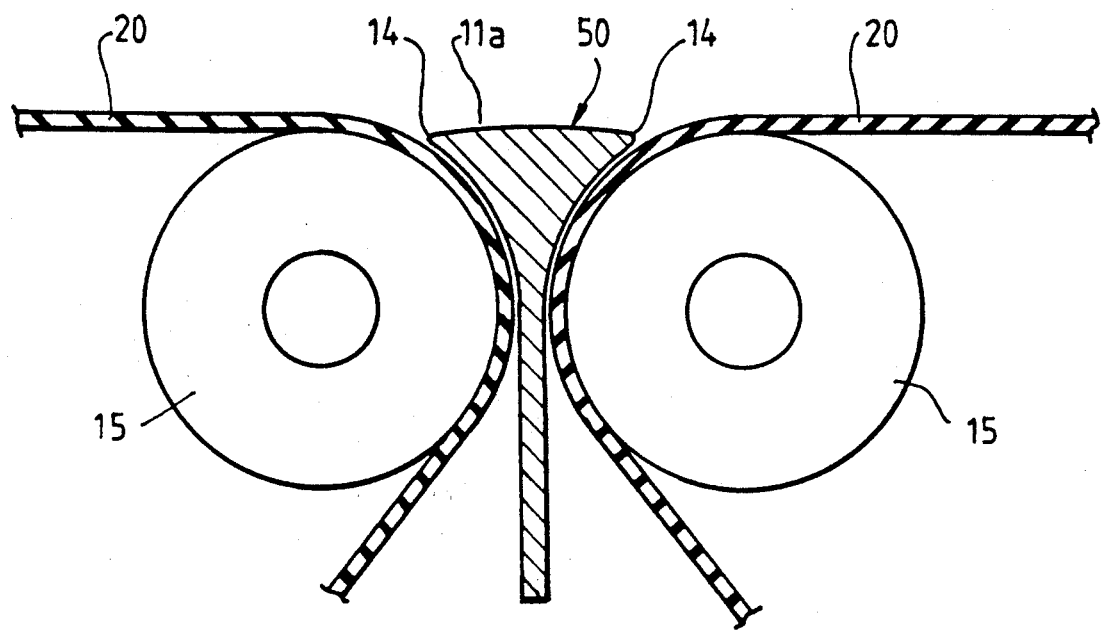
FIG. 4 is a view similar to FIG. 3 but showing a modified form of transfer.

In accordance with this aspect of the invention and as illustrated in FIG. 4, which contains dimension solely for exemplification, we physically locate the surface of the transfer plate 50 below the level of the belts 20, which can have a thickness of approximately 3 mm and we have found by calculation that provided that this spacing is of the order of 3 mm if the belts are moving at a speed of even 0.6 m/sec then it is effectively impossible for any part of the user or any solid article carried by the user to contact the gap beteen the transfer plate and the belt.

As can be seen from FIG. 4 the horizontal distance from the tangent point of the belt to the point at which the belt comes into close abutment to the edge 14 of the transfer plate 50 is 12 mm. At a belt speed of 0.6 metres/sec it will take a body some 15 mm in forward movement before it will drop 3 mm in vertical movement and thus any body leaving the belt will not strike the transfer plate 50 until it passes the gap.

This however is very much at the lower end of the speed to which the invention relates.

If the belt is travelling at 0.9 meters/sec then the distance travelled before dropping 3 mm is 23 mm and if at 1.2 meters/sec, which is the lower order of speed we would anticipate from the fastest belt then the distance travelled would be 30 mm. These distances are derived using a vertical acceleration of 1 g which would usually be the downward acceleration of a solid body and some consideration must be given to the situation as far as an elastic body is concerned.

At the somewhat higher speeds it can be shown that for a body to approach the gap between the edge 14 of the transfer plate and the belt there would need to be a downward acceleration of approximately 3 gs.

An elastic body, such as a balled up or compressed piece of fabric could accelerate at more than one g but normally this would tend to expand to a rest position with the overall acceleration in any direction being substantially less than 3 gs.

Also it will be appreciated that any article which is so accelerating will tend to be folded or bunched so it is unlikely that there would be a clean edge portion which would pass between the belt and the edge 14 of the transfer plate, unless the article was pressed upon by a solid object.

Whilst in the foregoing embodiment we have not described the actual surface of the transfer plate it would be possible to provide a profiled transfer plate of the type illustrated in FIG. 4 which would operate in the same way as described but which would, minimize, apparent change in level for a person passing thereover.

In a variation of the profile the edge of the plate abutting the preceding belt may be shaped to further lower the position of the belt/transfer plate edge abutment so that there is additional room for elastic material to unfold. Solid object will bridge the gap and contact the central portion of the transfer plate which is higher than the edge portions.

We could also provide an additional means which would act to prevent any entrance of material into the gap between the belt and the transfer plate.

This would be by providing a relatively powerful air draft passing upwardly from beneath the upper run of the belt and through the spaces between the belts and the edges of the transfer plates.

This air blast would of course act to prevent any light elastic object from approaching the gap whilst it would have no effect on solid objects.

Where the belt way is operating at a high speed, and depending upon the spacing between the belts it would be possible to omit the transfer plate completely.

A solid object would travel across the gap without making any contact and an elastic object would be unlikely to make contact, for reasons set out hereinbefore.

Even if an elastic object closely approached the belt surfaces it is most unlikely that it could be ingested as at the junction the two belts are moving in opposite directions and as the object is carried forwardly across the gap it would contact the belt which was moving in a direction away from the gap.

These, apparently, minor modifications greatly increase the safety of a moving beltway which separates individual belts by stationary plates, as it makes the transfer safe and effectively removes any likelihood of injury due to parts of a person's clothing or any other thing from entering the gap between the edge of the transfer plate and the belt.

These aspects of the invention are less applicable at lower speeds where a solid object such as a childs body or a shoe could, falling under 1 g of acceleration, so closely follow the elastic material that it could press the material agninst the slot and result in ingestion of the material. This prospect is increased at the end of the system where a body may come to rest over the transfer plate.

While we believe that such an occurrence will be so infrequent that the sensor triggered system shut-down will prevent more than slight scuffing some National Codes may require an alternative solution using ribs and combs.

At such junctions, therefore, different means may be required to ensure that articles are not gathered between the edges of the transfer plate. One particular way of ensuring safety at lower speeds is to use a modification of ribbed belts, which are often used in beltways.

Ribbed belts are, at each end, normally associated with combs which enter the recesses between the ribs and, hopefully, deflect any article which is resting on the belt over their top surface onto the transfer plate, or to the stationary area adjacent the end of the belt.

These are generally satisfactory but there have been many occasions where articles attached to persons have been caught on the comb or between the belt and the comb and persons can be injured in this way. Broken combs are common and when broken present a greater entrapment potential.

Figure 5:
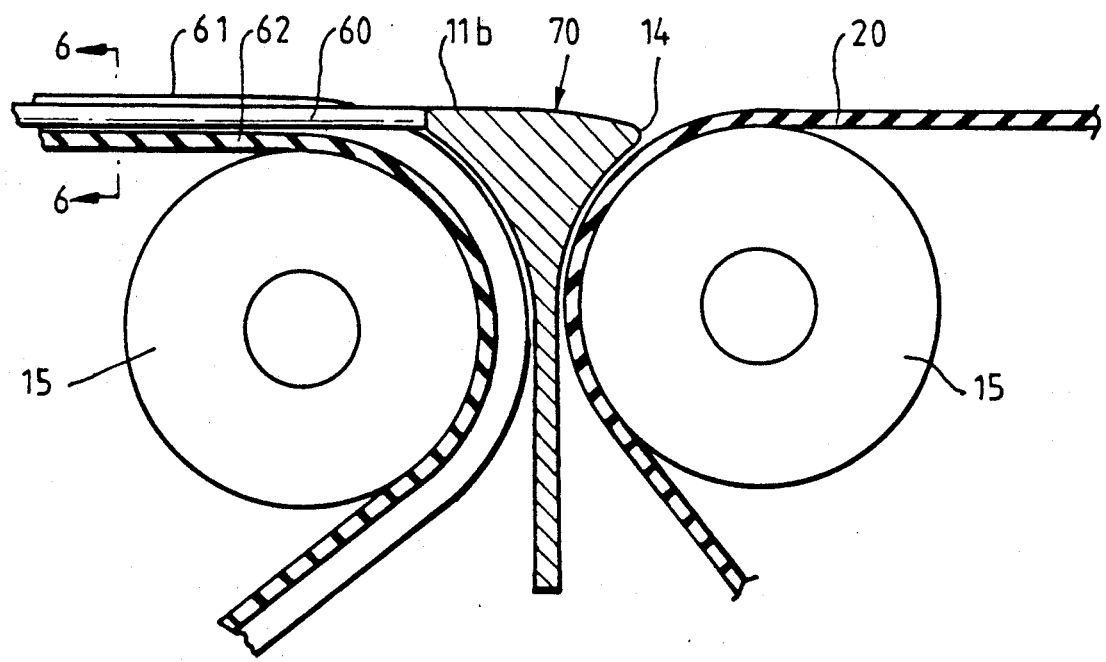
FIG. 5 is a schematic view showing the relationship between a ribbed belt having rods in the ribs and a higher speed belt using a transfer plate similar to that of FIG. 4.
Figure 6:
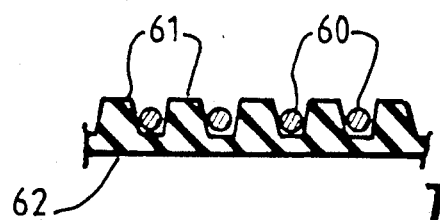
FIG. 6 is a sectional view along line 6—6 of FIG. 5.

In a further aspect of the invention, which is described illustratively in FIG. 5 we effectively extend the teeth of the combs along the whole length of the belt between two adjacent combs.

These extensions can be in the form of rods or bars 60 which have a width less than the spacing between adjacent ribs 61 and a height less than the height of the ribs so that they actually lie below the surface of the belt 62.

It will be appreciated that these rods 60 have a certain degree of flexibility but provided they are made of such material as chrome plated steel or the like they will not provide a stong frictional resistance where contacted by the belt and, also where there is an article resting on them they will act as a slider plate.

Under normal circumstances if there is a user standing on the belt then there will be no contact with the rods as the width of any part of a normal shoe is wider than the spacing between a pair of ribs.

There may however be circumstances where there are narrower articles which can fit between two adjacent ribs and one of these would be the heel of a spike heeled shoe or possibily something such as the edge of an article such as a brief case.

In such a case the article could rest on the upper surface of the rod and slide therealong but when it reaches a transfer plate it will automatically be moved directly onto the transfer plate and cannot pass between the transfer plate and the belt.

It will be seen that possibly the most desirable arrangement for a high speed beltway would be to have the initial or, say the first two or three belts with ribs having rods located between the ribs, the central portions of the beltway using flat belts with transfer plates between belts and below the level of the belt and the terminal portion or portions being ribbed and having rods located between the ribs, generally as illustrated in FIG. 4.

In an extreme case the highest speed transfers could be effected without transfer plates.

This would ensure safety both at the low speed portion of the beltway as well as at the high speed portions.

Where belts which can pass around a very small radius are used it may be that the ends of the sections can be defined by a radiused end of a slider plate and the belts can pass over these radiused ends.

Normally the belt would pass through slightly more than the angle necessary to be normal to the upper run, so that the belts of adjacent sections diverge slightly then normally pass around a roller which may define the commencement of the lower run.

Various modifications can be made in the described form of the invention without departing from the spirit and scope thereof.

I claim:

1. A beltway system for the transport of standing passengers, said system comprising, for the full length of the system, a plurality of co-linear sequentially disposed slider belt sections moving in the same direction; each said slider belt section comprising first and second spaced small diameter rollers which define receiving and delivery ends of the corresponding section, and a thin flat flexible continuous slider belt passing over and around said rollers to provide upper and lower runs; the diameters of said small diameter rollers being less than 70 mm and said sections being disposed closely adjacent to one another so that the spacing between the upper runs of adjacent belts is such that the footwear of even the smallest standing child passenger travelling from the delivery end of the belt of one section to the receiving end of the belt of the adjacent section is in contact with the belt of the adjacent section before losing contact with the belt of the one section; a transfer plate disposed between at least first and second adjacent beltway sections and extending across the width thereof, the transfer plate having a smooth upper surface and being formed so as to terminate at each edge thereof so closely to the belt of the second section as to restrict the entrance of a body between the transfer plate and the belt of the second section and at a level so as to provide a smooth transition from the belt of the first section to the belt of the second section, the transfer plate being located, at least on the side adjacent the delivery end of the first section, below the general level of the surface of the belt of said first section, the speed of the belt of the first section in relation to the radius defined by the belt of the first section as the belt passes over the roller at the delivery end of the belt of the first section and the spacing of the transfer plate below the general level of the surface of the belt of the first section being such that a body moving from the delivery end of the belt of the first section and falling under gravity cannot strike the transfer plate until the body has passed the junction between the belt of the first section and the transfer plate.

2. A beltway system as claimed in claim 1 wherein the transfer plate has a vertical extension depending downwardly between the belts for providing the necessary rigidity to the transfer plate to resist deformation thereof when the weight of the passengers pass thereover.

3. A beltway system as claimed in claim 1 wherein the upper surface of the transfer plate is curved.

4. A beltway system as claimed in claim 1 wherein adjacent beltway sections operate at different speeds to accelerate or decelerate passengers thereon.

5. A beltway system as claimed in claim 1 wherein adjacent beltway sections operate at the same speed.

6. A beltway system as claimed in claim 1 including a further slider belt section co-linear with the second slider belt section, said further section including a ribbed belt, a further transfer plate being disposed between the second section and the further section, the further section including a comb extending along the ribbed belt, said comb including teeth comprising longitudinal members which are narrower and shallower than the spacing between the ribs of the ribbed belt and which extend the length of the ribbed belt from the further transfer plate to another transfer plate located adjacent to the other end of the ribbed belt.

7. A beltway system for the transport of standing passengers, said system comprising, for the full length of the system, a plurality of co-linear sequentially disposed slider belt sections moving in the same direction; at least first and second slider belt sections being disposed in close end-to-end relation with no transfer plate therebetween, one of said first and second slider belt sections being the longest slider belt section of said beltway system and operating at the highest speed that any slider belt section of said beltway system operates, said first and second sections each comprising first and second spaced small diameter rollers which respectively define receiving and delivery ends of the corresponding section, and a thin flat flexible continuous slider belt passing over and around said rollers to provide upper and lower runs; the diameters of said small diameter rollers being less than 70 mm and said first and second sections being disposed so closely adjacent to one another that the spacing between the upper runs of the belts of the first and second sections is such that the footwear of even the smallest standing child passenger travelling from the delivery end of the belt of the first section to the receiving end of the belt of the second section is in contact with the belt of the second section before losing contact with the belt of the first section; the speed of the belt of the first section in relation to the radii defined by the belts of the first and second sections, as the belts of the first and second sections pass over the respective adjacent rollers of the first and second sections, being such that a body leaving the belt of the first section, travelling at approximately the speed of the belt of the first section and falling under gravity, is delivered sufficiently far above the point of closest juxtaposition of the belts of the first and second sections to ensure a successful automatic transfer of a standing, non-stepping passenger onto the belt of the second section, without any part of the footwear of that passenger contacting anything at or below the level of the belts of the first and second sections that is not a moving surface of the belt of the second section which is moving generally in the direction of travel of the system.

8. A beltway as claimed in claim 7 wherein adjacent beltway sections operate at different speeds to accelerate or decelerate passengers thereon.

9. A beltway system as claimed in claim 7 wherein adjacent beltway sections operate at the same speed.

10. A beltway system as claimed in claim 7 wherein said system further comprises a further slider belt section colinear with the second slider belt section, said further section including a ribbed belt, a first transfer plate being disposed between the second section and the further section, the further section including a comb extending along the ribbed belt, said comb including teeth comprising longitudinal members which are narrower and shallower than the spacing between the ribs of the ribbed belt and which extend the length of the ribbed belt from the first transfer plate to another transfer plate located adjacent to the other end of the ribbed belt.

* * * * *